(12) United States Patent
Allert et al.

(10) Patent No.: US 11,043,807 B2
(45) Date of Patent: Jun. 22, 2021

(54) SYSTEM FOR DISTRIBUTING LOCALLY GENERATED ENERGY TO MULTIPLE LOAD UNITS

(71) Applicant: SMA Solar Technology AG, Niestetal (DE)

(72) Inventors: Claus Allert, Kaufungen (DE); Volker Wachenfeld, Hofgeismar (DE); Aleksandra-Sasa Bukvic-Shaefer, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 64 days.

(21) Appl. No.: 16/600,831

(22) Filed: Oct. 14, 2019

(65) Prior Publication Data
US 2020/0044444 A1 Feb. 6, 2020

Related U.S. Application Data

(63) Continuation of application No. PCT/EP2018/056218, filed on Mar. 13, 2018.

(30) Foreign Application Priority Data

Apr. 13, 2017 (DE) .................. 10 2017 108 121.6

(51) Int. Cl.
*H02J 1/14* (2006.01)
*H02J 3/08* (2006.01)
(Continued)

(52) U.S. Cl.
CPC ................... *H02J 1/14* (2013.01); *H02J 3/08* (2013.01); *H02J 3/382* (2013.01); *H02J 1/002* (2020.01)

(58) Field of Classification Search
CPC ...... H02J 1/14; H02J 3/08; H02J 3/382; H02J 1/002; H02J 3/14; H02J 3/381;
(Continued)

(56) References Cited

U.S. PATENT DOCUMENTS 10,840,735 B1 * 11/2020 Cooper ................. H02J 3/0075
2008/0055941 A1 3/2008 Victor
(Continued)

FOREIGN PATENT DOCUMENTS

DE 102012214463 A1 2/2014
DE 102014101406 A1 8/2015
(Continued)

OTHER PUBLICATIONS

Wikipedia contributors. "Electricity meter." Wikipedia, The Free Encyclopedia. Wikipedia, The Free Encyclopedia, Feb. 16, 2021. Web. Feb. 19, 2021. (Year: 2021).*
(Continued)

*Primary Examiner* — Daniel Cavallari
(74) *Attorney, Agent, or Firm* — Eschweiler & Potashnik, LLC

(57) ABSTRACT

A system for distributing locally generated energy from at least one renewable DC source to a plurality of local load units of the system, including, for each load unit: an input terminal configured to connect to a grid, and an output terminal configured to connect to at least one load. Further for each load the system includes an inverter including an inverter input and an inverter output, wherein the inverter input is connected to the at least one renewable DC source and the inverter output is connected to the input terminal and to the output terminal of the respective load unit, and wherein the inverter is configured to convert a direct current at the inverter input into an alternating current at the inverter output. The system also includes a power meter including a power meter input connected to the input terminal of the respective load unit, wherein the power meter is configured to determine a current power consumption from the grid, and wherein the power meter includes a power meter output connected to the inverter of the respective load unit, and (Continued)

wherein the power meter is configured to transmit data relating to the current power consumption from the grid to the inverter. The inverter of the respective load unit is configured to determine an input DC voltage applied to its inverter input and to determine a power to be currently converted from the applied input DC voltage and the current power consumption data transmitted thereto.

12 Claims, 3 Drawing Sheets

(51) Int. Cl.
*H02J 3/38* (2006.01)
*H02J 1/00* (2006.01)

(58) Field of Classification Search
CPC ............... H02J 2300/24; H02J 2310/12; H02J 2203/20; H02J 3/383; Y02E 10/56; Y02E 60/00; Y04S 40/20
See application file for complete search history.

(56) References Cited

U.S. PATENT DOCUMENTS

| | | |
|---|---|---|
| 2011/0080044 A1 | 4/2011 | Schmiegel |
| 2011/0140648 A1* | 6/2011 | Lee .......................... H02J 3/32 |
| | | 320/101 |
| 2015/0032279 A1 | 1/2015 | Striuli |
| 2015/0155745 A1 | 6/2015 | Schuster |
| 2015/0244306 A1* | 8/2015 | Estes ....................... H02S 40/38 |
| | | 700/287 |
| 2016/0164299 A1 | 9/2016 | Becattni |

FOREIGN PATENT DOCUMENTS

| | | |
|---|---|---|
| DE | 102015110651 A1 | 1/2016 |
| DE | 102015101738 A1 | 8/2016 |
| EP | 2993752 A2 | 3/2016 |
| JP | 2003134673 A | 5/2003 |
| JP | 2013207970 A | 10/2013 |
| WO | 2013128588 A1 | 9/2013 |
| WO | 2015015528 A1 | 2/2015 |

OTHER PUBLICATIONS

International Search Report dated Jun. 25, 2018 in connection with International Application PCT/EP2018/056218.

* cited by examiner

SYSTEM FOR DISTRIBUTING LOCALLY GENERATED ENERGY TO MULTIPLE LOAD UNITS

CROSS REFERENCE TO RELATED APPLICATIONS

This application is a continuation of International Patent Application number PCT/EP2018/056218, filed on Mar. 13, 2018, which claims priority to German Patent Application number 10 2017 108 121.6, filed on Apr. 13, 2017, and is hereby incorporated by reference in its entirety.

FIELD

The disclosure relates to a system for the improved distribution of locally generated energy. The system has a plurality of local load units, and the locally generated energy can be provided by means of a shared renewable DC source. Furthermore, the disclosure also relates to a retrofit kit for an electrical distribution panel.

BACKGROUND

The problem of distributing locally generated energy arises, for example, in apartment buildings if a plurality of families or user groups wish to use a common local energy source but are also connected to a grid, for example a public energy grid. The distribution of the energy flows to the user groups, the capture of the consumed amounts of energy in each case and administrative provisions of the grid operators cause the sharing of decentralized, in particular renewable, energy sources to be complicated and consequently cost-intensive. Therefore, either local energy generation installations for only one user group have previously been operated or large installations have fed into a larger grid in order to be distributed and captured using the already existing grids and energy meters. Since the feed in of regenerative energy to the grid is financially less and less attractive in many countries, the self consumption from local renewable energy sources is becoming more interesting. However, this is also useful at the same time since the grid are therefore not loaded with the fluctuating amount of regenerative energy and local generation and local consumption therefore come together.

The sharing of a local regenerative energy source has only been rarely implemented even though the self consumption rate can be considerably increased by sharing a photovoltaic installation on the roof of an apartment building, for example. With the increasing number of different users, the variation in the energy consumption habits increases, and load peaks and troughs in the grid are statistically compensated by the large number of consumers. In a similar manner, the distributed use by individuals being active during the day or at night or families with different habits in terms of cooking, washing or using other electrical or electronic devices can homogenize the energy consumption in an apartment building. Therefore the locally energy generation installation can be used in an optimized manner if the energy is distributed to different user groups. If there is nevertheless still surplus energy, an energy storage can be provided. However, this energy storage can be considerably smaller and therefore more cost-effective than it would be the case in one individually used installation or indeed a plurality of individually used installations.

The prior art discloses the practice of providing a central control device for sharing a local regenerative energy source by a plurality of user groups, as disclosed in EP 2 993 752 A2, for example. In this case, an inverter and an electricity meter are provided for each user group and each inverter is controllably connected to a central control device, wherein the central control device divides the electrical power to be provided among the user groups. The installation, operation and maintenance of such a central control device are associated with effort and costs.

SUMMARY

In the present disclosure the electrical power to be provided can be distributed among the user groups in a simple and cost-effective manner even without a central control device.

A system according to the disclosure for distributing locally generated energy from at least one renewable DC source to a plurality of local load units of the system comprises, for each load unit, an input configured to be connected to an grid and an output configured to be connected to at least one load. The load units each comprise an inverter with an inverter input and an inverter output, wherein the inverter input is connected to the DC source and the inverter output is connected to the input and to the output of the respective load unit. The inverter converts a direct current at the inverter input into an alternating current at the inverter output. The load units also comprise a power meter with a power meter input connected to the input of the respective load unit in order to determine a current power consumption from the grid, and with a power meter output connected to the inverter of the respective load unit. The power meter output transmits data relating to the current power consumption from the grid to the inverter. At the same time, the inverter of the respective load unit determines an input DC voltage applied to its inverter input and determines a power to be currently converted from the applied input DC voltage and the transmitted power consumption data.

In this manner, the load units are arranged parallel to one another between the grid and the local DC source, and the associated inverters act autonomously without a superordinate controller. The power meter may be an electricity meter, as is usually present in the associated load unit, for example an apartment in an apartment building. The power meter determines the current power consumption from the grid and transmits this value to the associated inverter in a wired or wireless manner. Loads can be connected to the output of the load unit. These may be, for example, loads which are conventional in a household such as cookers, dishwashers, washing machines, lighting means or the like. If the inverter is active, that is to say it converts direct current present on the input side into grid-compliant alternating current, the loads can be supplied with power from the grid and from the local DC source. In this case, single-phase or multi-phase inverters can be used. Since the electrical loads are connected in many countries in a manner divided among a plurality of phases of a grid, inverters which are adapted to the respective conditions will be selected. The associated inverter can use the transmitted power meter data to determine the power which would additionally need to be converted from the local DC source at the current time in order to completely supply the loads from the local DC source. At the same time, the associated inverter also determines measured values which characterize the input DC voltage applied to its input, for example the amplitude of the input DC voltage. This may also be a signal which is modulated onto the input DC voltage and, like the input DC voltage itself, is generated by the local DC source.

In many generators, the terminal voltage falls during loading; and a local DC source provided as a photovoltaic generator can behave in a similar manner, for example, or this generator behavior can be simulated by a DC chopper stage (DC/DC converter) connected to the photovoltaic generator. The terminal voltage can therefore act as a measure of the loading of the generator and power reserves of the generator can be inferred from the level of the terminal voltage. A DC chopper stage connected to the photovoltaic generator could also modulate a signal from which the power reserves of the photovoltaic generator can be derived. If the inverter associated with the respective load unit now determines a current input voltage level or a corresponding signal which varies with increasing loading, the inverter can determine whether the local DC source still has power reserves, for example by means of a comparison with stored threshold values, characteristic curves or the like. A power to be currently converted can be determined from the comparison of indicators of power reserves and the current power consumption from the grid. This may be, for example, the power which would need to be additionally converted from the local DC source at the current time in order to completely supply the loads from the local DC source if there are sufficient power reserves. Alternatively, the power to be currently converted may correspond to a portion of the power which would need to be additionally converted from the local DC source at the current time in order to completely supply the loads from the local DC source.

In one advantageous embodiment of the system according to the disclosure, the inverter of the respective load unit determines from the input DC voltage applied to its inverter input a maximum possible power which can be currently converted according to a predefined first characteristic curve. Such a characteristic curve may establish, for example, a linear relationship between the input DC voltage and the maximum possible power which can be converted by the relevant inverter, with the result that, in the case of average loading of the DC source, the power converted by the inverter can be adapted to the power required by the connected loads. The inverter could therefore increase its currently converted power along the characteristic curve, for example, until all loads have been supplied or the maximum performance of the DC source, that is to say the maximum possible power which can be currently converted, has been reached.

If the maximum possible power which can be currently converted is greater than or equal to the power consumption from the grid, another advantageous embodiment of the system according to the disclosure provides for the inverter of the respective load unit to determine the power to be currently converted in such a manner that the power consumption from the grid tends toward a preset limit value. In a continuous method, for example, the inverter of the respective load unit determines the level of the current power consumption from the grid and, in one embodiment of the present disclosure, attempts to adapt the power converted by it in such a manner that it corresponds to stored specifications. For example, an upper limit for the power consumption from the grid by the load unit under consideration could be set, with the result that the associated inverter increases or reduces the power converted by it until this upper limit has been reached.

Another variant could involve storing a limit value for the power consumption from the local DC source, with the result that the inverter increases its currently converted power only until this limit value has been reached, and any further consumption of the connected loads is supplied from the grid. It is also conceivable, in one embodiment, for the control objective for the inverter of the respective load unit to be that a particular portion of the energy consumed in the respective load unit is always taken from the local DC source. The prerequisite for this is that the local DC source has sufficient power reserves and there is a need from the connected loads.

In one embodiment of the system according to the disclosure, the preset limit value is 0 kW, which means that, if the maximum possible power which can be currently converted is at least equal to the power consumption from the grid, the inverter of the respective load unit determines the power to be currently additionally converted in such a manner that it corresponds to the level of the power consumption from the grid. The inverter of the respective load unit consequently increases its currently converted power by the level of the previously determined power consumption from the grid, with the result that the loads connected to the respective load unit are then completely supplied from the local DC source.

If the maximum possible power which can be currently converted is less than the power consumption from the grid, the inverter of the respective load unit determines the power to be currently converted in another embodiment of the system according to the disclosure in such a manner that the power to be currently converted corresponds to the maximum possible power which can be currently converted. This minimizes the power consumption from the grid. This means that, if the power offered by the local DC source is not sufficient to supply all loads connected to the respective load unit to the desired extent, for example, the inverter of the respective load unit increases the power converted by it, at least by the maximum possible amount.

In one advantageous embodiment of the system according to the disclosure, the inverters of the respective load units are provided as unidirectional and possibly DC-isolating inverters. Even if an electrical storage is provided in a system according to the disclosure on the DC voltage side, a flow of energy from the AC voltage side to the DC voltage side of the inverters of the system according to the disclosure is not intended. Therefore, inverters whose semiconductor switches are optimized for the direction of energy flow from DC to AC are sufficient and therefore reduce the costs of the system according to the disclosure. In order to ensure electrical decoupling of the DC voltage side from the AC voltage side, the inverters may be provided as DC-isolating inverters.

In another embodiment of the system according to the disclosure, the first characteristic curves of the respective load units differ from one another. This makes it possible to stipulate different control specifications for the inverters of the respective load units. The different characteristic curves may be stored in control components of the respective inverters. Even though the same input DC voltage is applied to all inverters of the system according to the disclosure, the inverters can determine different maximum possible powers which can be currently converted for the respective load unit from the input DC voltage using different characteristic curves. This feature also makes it possible to distribute the locally generated energy in an uneven manner, if this is desired, without a superordinate controller. However, it goes without saying that, if uniform distribution is desired, the same characteristic curve can also be stored in each inverter of the system according to the disclosure, with the result that the same power to be currently converted is determined by the inverters in the case of the same energy consumption of the connected loads.

In another embodiment of the system according to the disclosure, for at least one load unit, the power converted by the inverter of the relevant load unit is summed within a time window. If a threshold value is predefined for the summed power—therefore an energy threshold value—of the relevant load unit, the inverter of the relevant load unit reduces its currently converted power to zero upon reaching the threshold value. If different time windows are also provided for different load units in a manner distributed over the day, the energy provided by the local DC source can thus be divided into portions as it were and can be divided by the inverters of the system according to the disclosure among the different load units in a manner distributed over the day without the need for a superordinate controller.

In one embodiment, the system according to the disclosure also comprises a storage unit. The storage unit comprises at least one battery and a bidirectional DC chopper, wherein a first terminal of the bidirectional DC chopper is connected to the DC source and a second terminal of the bidirectional DC chopper is connected to the battery. The bidirectional DC chopper determines a maximum possible power which can be currently stored from an input DC voltage applied to its first terminal according to a predefined second characteristic curve. In a similar manner to the inverters in the load units, the bidirectional DC chopper in the storage unit determines whether the local DC source still has power reserves from the current input voltage level, for example by means of a comparison with stored threshold values, characteristic curves or the like. If previously unused power is still locally available, it can be stored in the battery. In another embodiment, the predefined second characteristic curve differs from the predefined first characteristic curve. This makes it possible to achieve the situation, for example, in which the loads connected to the load units are first of all supplied with electrical energy and the battery is charged only secondarily. If the system according to the disclosure is used to optimize self consumption, direct local consumption will be given preference over the storage of energy. On the one hand, this makes it possible to avoid conversion losses during storage in the battery and discharging from the battery. On the other hand, the battery may have considerably smaller dimensions, which also makes the system according to the disclosure cost-effective in view of the fact that electrical storage technology is still very expensive.

In another embodiment of the system according to the disclosure, the bidirectional DC chopper determines a currently required discharge power from an input DC voltage applied to its first terminal according to the predefined second characteristic curve. If the local energy consumption is higher than the simultaneously available power from the local DC source and if the applied input DC voltage falls below a predefined threshold, for example, this may be a signal to the bidirectional DC chopper to feed energy from the battery into the DC distribution panel of the system according to the disclosure. This makes it possible to further increase the self consumption of the locally generated energy.

If all connected loads are supplied from the local DC source and the storage capacity of the battery is also fully used, further variable loads may be provided, for example, and are switched on in order to consume excess local energy. The switching-on of the variable loads could be triggered, for example, by means of a special signal (broadcast signal) modulated onto the electrical lines. If further local consumption is no longer possible, the local DC source can be curtailed, that is to say its power can be reduced such that local generation and consumption are balanced out. A feed in of energy into the grid is not provided in the system according to the disclosure.

A system according to the disclosure is distinguished by particularly compact and cost-effective components and is ideally suited for distributing the energy from a shared photovoltaic installation, for example in an apartment building. This is also advantageous, in particular, when retrofitting a building with a photovoltaic installation since only a few installation steps need to be carried out and only a few components need to be installed. Conventional electrical distribution panels, in particular apartment distribution panels, have a connection to the AC voltage distribution grid and are equipped with an electricity meter which measures the energy consumption of the apartment/subunit or the like. The electrical power is distributed on lines which are equipped with fuses and are routed to the respective consumption points.

One embodiment relates to a retrofit kit for an electrical distribution panel, in particular an apartment distribution panel, for use in a system according to the disclosure. In this case, the retrofit kit comprises an inverter having an inverter output configured to be connected to an alternating voltage input of the distribution panel. The inverter has an inverter input configured to be connected to at least one renewable DC source, and a controller which determines an input DC voltage applied to the inverter input. The retrofit kit also comprises a communication connection for transmitting power consumption data from a meter arranged in the distribution panel to the inverter, and a connection for a DC distribution panel for connecting the distribution panel to the renewable DC source. The controller determines a power to be currently converted from the applied input DC voltage and transmitted power consumption data.

In this manner, no further complicated installation work is required beyond the installation of the renewable DC source, in particular a photovoltaic installation on the roof of the building, and of a line as DC distribution panel through a central installation shaft in the building and its routing to the apartment distribution panels. Since the inverter for a residential unit can be very compact in the case of an energy consumption conventional for a household, the components of the retrofit kit can generally be accommodated in the existing apartment distribution panel. This makes it possible to subsequently install a photovoltaic installation to be shared in a cost-effective and low-complexity manner, in particular in an apartment building.

The disclosure is described below on the basis of example embodiments using drawings from which, in joint consideration with the features of the claims, further features, properties and advantages of the disclosure emerge.

DETAILED DESCRIPTION

Figure 1:
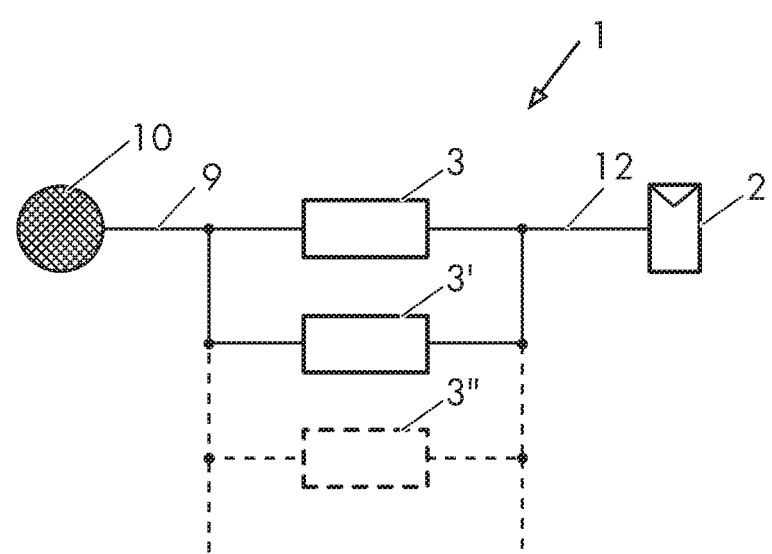
FIG. 1 shows a schematic illustration of an example configuration of a system according to the disclosure.

FIG. 1 schematically shows an example configuration of a system 1 according to the disclosure. Load units 3, 3', 3"

are connected to a grid 10 at an grid connection 9. This may be, for example, a low-voltage distribution grid of a public AC voltage grid which is generally provided by a grid operator and often has a multi-phase design. The load units 3, 3', 3" may be different apartments in an apartment building, floors or other subunits of a building or business. Furthermore, the load units 3, 3', 3" are connected to a DC distribution panel 12, to which a shared DC source 2 is also connected. The DC source 2 may be, for example, a photovoltaic installation on the roof of an apartment building. In this case, a DC/DC converter (not shown) will usually also be arranged between the PV generator and the DC distribution panel 12, said controller controlling the maximum power point (MPP) of the PV generator.

Figure 2:
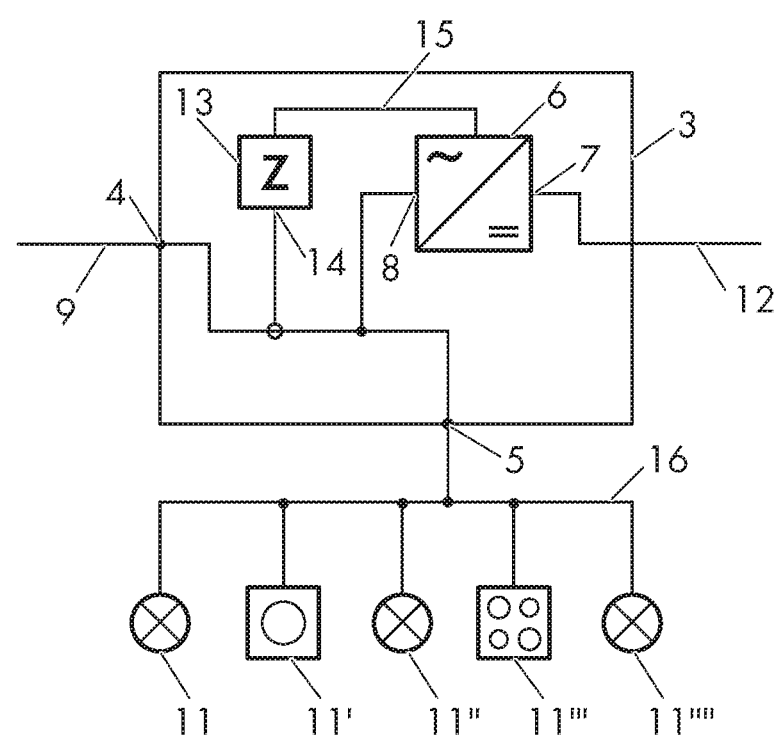
FIG. 2 shows an example configuration of a load unit of a system according to the disclosure.

FIG. 2 shows an example configuration of a load unit 3, as may be included in a system 1 according to the disclosure. The load unit 3 is connected at its input 4 to the grid connection 9 and to a DC distribution panel 12, as described above. Furthermore, the load unit 3 also comprises an output 5, to which electrical loads 11, 11', 11", 11'" are connected via an AC distribution panel 16. The loads 11, 11', 11", 11'" may be conventional loads in a household such as light fittings, washing machines, cookers etc. but also production machines, for example in a business. The loads 11, 11', 11", 11'", . . . can be configured to consume single-phase or multi-phase AC power and the AC distribution panel 16 can distribute single-phase loads to a plurality of phases, as is conventional in a household, for example. The current power consumption from the grid 10 is determined in the load unit 3 by means of a power meter 13. For this purpose, a power meter input 14 is connected to the input 4. The power meter 13 may be an electricity meter, as is conventionally present in an apartment in an apartment building, for example. However, this meter must be configured at least to transmit the power consumption data currently measured by it.

The load unit 3 also comprises an inverter 6, the inverter input 7 of which is connected to the DC distribution panel 12 and the inverter output 8 of which is connected to the connection between the input 4 and the output 5 of the load unit 3. The inverter 6 is configured to convert DC power available at its input into grid-compliant AC power and to feed the latter into the connection between the input 4 and the output 5 of the load unit 3 or the AC distribution panel 16.

The power meter 13 transmits its currently measured power consumption data to the inverter 6 via a power meter output 15. This transmission can take place in a wired or wireless manner. The idea on which the system 1 according to the disclosure is based is that of consuming the power provided by the DC source 2 as completely as possible within the system 1. For this purpose, the inverter 6 may be configured in such a manner that it increases the power fed in by it until the power consumption from the grid has fallen to zero watts. All loads 11, 11', 11", 11'" connected to the load unit 3 are either then supplied from the local DC source 2 (or there is no consumption at all).

In order to determine whether the DC source 2 has power reserves, that is to say whether the inverter 6 can further increase the power fed in by it in order to supply the connected loads 11, 11', 11", 11'", . . . with more power, the inverter 6 can measure the DC voltage applied to its input 7, for example. The DC voltage may fall in the case of high loading of the DC source 2. The inverter 6 can conclude, for example from a DC voltage which has fallen below a predefined threshold value, that it cannot increase the power converted by it any further. If the DC voltage continues to fall, it is possible to store the fact that the inverter 6 reduces the power fed in by it. Conversely, a high DC voltage can indicate that it is possible to increase the converted power.

Alternatively, the inverter 6 could determine a signal modulated onto the input DC voltage as an indicator of the power reserves of the DC source 2 at its inverter input 7. This signal can be modulated onto the input DC voltage by a DC/DC converter (not shown) arranged between the PV generator and the DC distribution panel 12, and threshold values for this signal can then be used to determine the power reserves of the DC source 2, as described above. The threshold values or characteristic curves for describing the relationship between the signal or DC voltage level and the power reserves of the DC source 2 can be stored in the controller (not shown) of the inverter 6.

The components of a load unit 3 can be in a conventional electrical distribution panel of an apartment. Since the electricity meter and the connections 4 and 5 are usually already present there, the distribution panel can also be subsequently easily upgraded to form a load unit 3 for use in the system 1 according to the disclosure by additionally installing an inverter 6, routing the DC distribution panel 12 and setting up a communication connection between the electricity meter 13 and the inverter 6.

Figure 3:
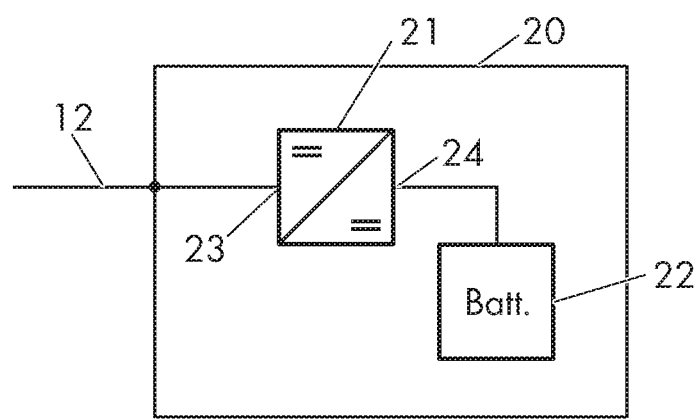
FIG. 3 shows an example configuration of a storage unit of a system according to the disclosure.

FIG. 3 shows an example configuration of a storage unit 20 for use in a system 1 according to the disclosure. The storage unit 20 comprises a battery 22 and a bidirectional DC chopper (DC/DC converter) 21. A terminal 23 of the DC/DC converter 21 is connected to the DC distribution panel 12 and, via the latter, the DC/DC converter is connected to the DC source 2. A terminal 24 of the DC/DC converter 21 is connected to the battery 22, wherein the battery 22 may consist of a plurality of battery subunits or a plurality of batteries. The DC/DC converter 21 acts, on the one hand, as a charging controller by taking energy from the DC distribution panel 12 and storing it in the battery 22 and, on the other hand, the DC/DC converter 21 also controls the removal and feeding of energy from the battery 22 into the DC distribution panel 12. In a similar manner to the load unit 3 described above, the DC/DC converter 21 can measure the DC voltage applied to its terminal 23 or a signal modulated onto the input DC voltage as an indicator of the power reserves of the DC source 2. The controller of the DC/DC converter 21 stores a second characteristic curve which establishes a relationship between electrical characteristic variables, for example between the applied DC voltage level and an available DC power or the maximum possible power which can be currently stored. This second characteristic curve may have a different gradient than the first characteristic curve, which results in a different response behavior of load units and storage units with respect to the same measured DC voltage level. This may mean that the loads connected to the load units are first of all supplied with electrical energy and the battery is charged only secondarily.

If, for example, the measured DC voltage level falls below a further, lower threshold, this may indicate a higher local consumption of electrical power in comparison with the local generation. This may be the signal for the storage unit to feed its stored energy into the DC distribution panel 12 again. The previously locally excessive energy can thus be supplied for self consumption again.

The invention claimed is:
1. A system for distributing locally generated energy from at least one renewable DC source to a plurality of local load units of the system, comprising, for each load unit:

an input terminal configured to connect to a grid,
an output terminal configured to connect to at least one load,
an inverter comprising an inverter input and an inverter output, wherein the inverter input is connected to the at least one renewable DC source and the inverter output is connected to the input terminal and to the output terminal of the respective load unit, and wherein the inverter is configured to convert a direct current at the inverter input into an alternating current at the inverter output,
a power meter comprising a power meter input connected to the input terminal of the respective load unit, wherein the power meter is configured to determine a current power consumption from the grid, and wherein the power meter comprises a power meter output connected to the inverter of the respective load unit, and wherein the power meter is configured to transmit data relating to the current power consumption from the grid to the inverter, and
wherein the inverter of the respective load unit is configured to determine an input DC voltage applied to its inverter input and to determine a power to be currently converted from the applied input DC voltage and the current power consumption data transmitted thereto.

2. The system as claimed in claim 1, wherein the inverter of the respective load unit is configured to determine from the input DC voltage applied to its inverter input a maximum possible power which can be currently converted according to a predefined first characteristic curve.

3. The system as claimed in claim 2, wherein, if the maximum possible power which can be currently converted is greater than or equal to the current power consumption from the grid, the inverter of the respective load unit is configured to determine the power to be currently converted in such a manner that the current power consumption from the grid reaches a preset limit value.

4. The system as claimed in claim 3, wherein the preset limit value is 0 kW.

5. The system as claimed in claim 2, wherein, if the maximum possible power which can be currently converted is less than the power consumption from the grid, the inverter of the respective load unit is configured to determine the power to be currently converted in such a manner that it corresponds to a level of the maximum possible power which can be currently converted, with the result that the current power consumption from the grid is minimized.

6. The system as claimed in claim 1, wherein the inverter is unidirectional and a galvanically-isolating inverter.

7. The system as claimed in claim 2, wherein the first characteristic curves of the respective load units differ from one another.

8. The system as claimed in claim 2, wherein, for at least one load unit, the power converted by the inverter of the load unit is summed up within a time window and a threshold value is predefined for the summed power of the load unit, wherein the inverter of the load unit reduces its currently converted power to zero upon reaching the threshold value.

9. The system as claimed in claim 2, further comprising a storage unit comprising at least one battery and a bidirectional DC chopper, wherein a first terminal of the bidirectional DC chopper is connected to the DC source and a second terminal of the bidirectional DC chopper is connected to the battery, and wherein the bidirectional DC chopper is configured to determine a maximum possible power which can be currently stored from an input DC voltage applied to its first terminal according to a predefined second characteristic curve.

10. The system as claimed in claim 9, wherein the predefined second characteristic curve differs from the predefined first characteristic curve.

11. The system as claimed in claim 9, wherein the bidirectional DC chopper is configured to determine a currently required discharge power from an input DC voltage applied to its first terminal according to the predefined second characteristic curve.

12. A retrofit kit for an electrical distribution panel, in particular an apartment distribution panel, for use in a system according to claim 1, comprising:
an inverter, comprising:
an inverter output terminal configured to connect to an alternating voltage input of distribution panel,
an inverter input terminal configured to connect to at least one renewable DC source, and
a controller configured to determine an input DC voltage applied to the inverter input terminal and configured to determine a power to be currently converted from the input DC voltage and a power consumption data,
a communication connection configured to transmit the power consumption data from a meter arranged in the distribution panel to the inverter, and
a connection interface configured to connect the distribution panel to the renewable DC source.

* * * * *